United States Patent
Ohta

(10) Patent No.: US 9,509,920 B2
(45) Date of Patent: Nov. 29, 2016

(54) METHOD OF AUTOMATICALLY TRACKING AND PHOTOGRAPHING CELESTIAL OBJECTS, AND CAMERA EMPLOYING THIS METHOD

(75) Inventor: Makoto Ohta, Tokyo (JP)

(73) Assignee: RICOH IMAGING COMPANY, LTD., Tokyo (JP)

(\*) Notice: Subject to any disclaimer, the term of this patent is extended or adjusted under 35 U.S.C. 154(b) by 934 days.

(21) Appl. No.: 13/641,545

(22) PCT Filed: Apr. 27, 2011

(86) PCT No.: PCT/JP2011/060219
§ 371 (c)(1),
(2), (4) Date: Oct. 16, 2012

(87) PCT Pub. No.: WO2011/136251
PCT Pub. Date: Nov. 3, 2011

(65) Prior Publication Data
US 2013/0033607 A1  Feb. 7, 2013

(30) Foreign Application Priority Data
Apr. 28, 2010  (JP) ................. 2010-103930

(51) Int. Cl.
H04N 5/225  (2006.01)
H04N 5/262  (2006.01)
(Continued)

(52) U.S. Cl.
CPC ............ *H04N 5/2628* (2013.01); *G03B 15/00* (2013.01); *G03B 15/16* (2013.01); *H04N 5/232* (2013.01)

(58) Field of Classification Search
CPC .... H04N 5/2628; H04N 5/232; G03B 15/00; G03B 15/16
USPC ......................................... 348/169
See application file for complete search history.

(56) References Cited

U.S. PATENT DOCUMENTS 7,057,645 B1  6/2006  Hara et al.
7,558,405 B2  7/2009  Tico et al.
(Continued)

FOREIGN PATENT DOCUMENTS

CN  101208722  6/2008
CN  101216550  7/2008
(Continued)

OTHER PUBLICATIONS

Japanese Office Action, mail date Apr. 8, 2014, along with an English translation thereof.
(Continued)

*Primary Examiner* — Jamie Atala
*Assistant Examiner* — Nguyen Truong
(74) *Attorney, Agent, or Firm* — Greenblum & Bernstein P.L.C.

(57) ABSTRACT

A method of automatically tracking and photographing celestial objects which captures a still image of a celestial object(s) where each celestial object appears stationary simply by making an exposure with a camera directed toward an arbitrary-selected celestial object and fixed with respect to the ground and without using an equatorial, and also a camera that employs this method. The method includes inputting latitude information at a photographic site, photographing azimuth angle information, photographing elevation angle information, attitude information of a photographic apparatus and focal length information of a photographing optical system; calculating movement amounts of the celestial object image relative to the photographic apparatus, for fixing the celestial object image with respect to the predetermined imaging area of an image pickup device, using all of the input information; and obtaining a photographic image by moving at least one of the predetermined imaging area and the celestial object image.

19 Claims, 10 Drawing Sheets

(51) Int. Cl.
*G03B 15/00* (2006.01)
*G03B 15/16* (2006.01)
*H04N 5/232* (2006.01)

(56) References Cited

U.S. PATENT DOCUMENTS

| | | | |
|---|---|---|---|
| 7,769,475 B2 | 8/2010 | Fujimoto et al. | |
| 2002/0136150 A1 | 9/2002 | Mihara et al. | |
| 2006/0284495 A1 | 12/2006 | Seo et al. | |
| 2007/0002146 A1 | 1/2007 | Tico et al. | |
| 2010/0103251 A1 | 4/2010 | Numako | |
| 2010/0141773 A1* | 6/2010 | Jang | G06F 3/03542 |
| | | | 348/169 |
| 2010/0145783 A1 | 6/2010 | Ono et al. | |
| 2011/0285855 A1 | 11/2011 | Ohta | |
| 2011/0292217 A1 | 12/2011 | Ohta | |
| 2011/0293139 A1 | 12/2011 | Ohta | |

FOREIGN PATENT DOCUMENTS

| | | |
|---|---|---|
| JP | 06-130446 | 5/1994 |
| JP | 2000-224470 | 8/2000 |
| JP | 2003-259184 | 9/2003 |
| JP | 2004-201056 | 7/2004 |
| JP | 2006-279135 | 10/2006 |
| JP | 2006-287375 | 10/2006 |
| JP | 2007-025616 | 2/2007 |
| JP | 2007-089087 | 4/2007 |
| JP | 2008-017223 | 1/2008 |
| JP | 2008-289052 | 11/2008 |
| JP | 2008-544674 | 12/2008 |

OTHER PUBLICATIONS

China Office action, dated May 4, 2015 along with an English translation thereof.
Search report from E.P.O., mail date is Feb. 10, 2014.
U.S. Appl. No. 13/109,247 to Makoto Ohta, filed May 17, 2011.
U.S. Appl. No. 13/114,320 to Makoto Ohta, filed May 24, 2011.
U.S. Appl. No. 13/117,517 to Makoto Ohta, filed May 27, 2011.
U.S. Appl. No. 13/494,196 to Makoto Ohta, filed Jun. 12, 2012.
U.S. Appl. No. 13/493,127 to Makoto Ohta, filed Jun. 11, 2012.
World Intellectual Property Organization Office action, dated Jul. 24, 2012 along with an english translation thereof.
Search report from World Intellectual Property Organization, mail date is Jun. 7, 2011.
European Office action, dated Feb. 25, 2015.

* cited by examiner

METHOD OF AUTOMATICALLY TRACKING AND PHOTOGRAPHING CELESTIAL OBJECTS, AND CAMERA EMPLOYING THIS METHOD

TECHNICAL FIELD

The present invention relates to a method of automatically tracking and photographing celestial objects which enables the capture of a freeze-frame picture of a celestial object(s), and further relates to a camera employing this method.

BACKGROUND ART

If long exposure astrophotography is carried out with a fixed camera, added light of stars during a long exposure form straight or curved light trails in the captured image because celestial objects move relative to the camera due to the earth's rotation (diurnal motion). To carry out a long exposure in order to photograph a celestial object so that the celestial object appears to be still (a luminous point), an equatorial equipped with an auto tracking system is generally used.

In recent years, a method has been proposed in which a celestial object(s) is photographed a plurality of times with a fixed digital camera without using an equatorial, and thereafter, the images thus obtained at the plurality of times are added while correcting the positions of the celestial object(s) using data on the obtained images (Patent Literatures 1 and 2).

CITATION LIST

Patent Literature

Patent Literature 1: Japanese Unexamined Patent Publication No. 2006-279135
Patent Literature 2: Japanese Unexamined Patent Publication No. 2003-259184
Patent Literature 3: Japanese Unexamined Patent Publication No. 2007-25616

SUMMARY OF THE INVENTION

Technical Problem

However, an equatorial equipped with an auto tracking system is expensive, heavy and difficult to handle. The type of digital camera (disclosed in Patent Literatures 1 and 2) which synthesizes a plurality of images has inferior image registration accuracy and has a slow image processing speed, and therefore, it is practically impossible to synthesize a plurality of images using only such a type of digital camera.

An object of the present invention is to achieve a method of automatically tracking and photographing celestial objects which enables the capture of a still image of a celestial object(s) in a state where each celestial object appears stationary simply by making an exposure with a camera directed toward an arbitrary-selected celestial object and fixed with respect to the ground without using an equatorial, and also to achieve a camera that employs this method.

Solution Problem

A method of automatically tracking and photographing a celestial object according to the present invention is provided, which moves relative to a photographic apparatus due to diurnal motion so that a celestial object image, which is formed on an imaging surface of an image pickup device via a photographing optical system, becomes stationary relative to a predetermined imaging area of the imaging surface of the image pickup device during a tracking and photographing operation, the method including inputting latitude information at a photographic site, photographing azimuth angle information, photographing elevation angle information, attitude information of the photographic apparatus and focal length information of the photographing optical system; calculating movement amounts of the celestial object image relative to the photographic apparatus for fixing the celestial object image with respect to the predetermined imaging area of the image pickup device, using all of the input information; and obtaining a photographic image by moving at least one of the predetermined imaging area and the celestial object image based on the calculated relative movement amounts.

In an aspect of the invention, the method of automatically tracking and photographing a celestial object further includes obtaining a photographic image while moving the image pickup device in a parallel manner in directions orthogonal to an optical axis of the photographing optical system and rotating the image pickup device about an axis parallel to the optical axis based on the calculated relative movement amounts to photograph the celestial object as a point.

In another aspect of the invention, in the method of automatically tracking and photographing a celestial object, the predetermined imaging area is a trimmed area which is defined by electronically trimming part of an entire imaging area of the image pickup device, the method further including obtaining a photographic image while, based on the calculated relative movement amounts, moving the trimmed area in a parallel manner in directions orthogonal to an optical axis of the photographing optical system and rotating the trimmed area about an axis parallel to the optical axis to photograph the celestial object as a point.

In a further aspect of the invention, in the method of automatically tracking and photographing a celestial object, the predetermined imaging area is a trimmed area which is defined by electronically trimming part of an entire imaging area of the image pickup device, the method further including obtaining a photographic image while, based on the calculated relative movement amounts, moving the celestial object image relative to the photographic apparatus by decentering a portion of the photographing optical system, and rotating the trimmed area about an axis parallel to an optical axis of the photographing optical system to photograph the celestial object as a point. The term "optical axis of the photographing optical system" refers to the optical axis of the photographing optical system in an initial state before performing an eccentric adjustment.

In a further aspect of the invention, in the method of automatically tracking and photographing a celestial object, the predetermined imaging area is a trimmed area which is defined by electronically trimming part of an entire imaging area of the image pickup device, the method further comprising obtaining a photographic image while, based on the calculated relative movement amounts, moving the image pickup device in a parallel manner in directions orthogonal to an optical axis of the photographing optical system and rotating the trimmed area about an axis parallel to the optical axis to photograph the celestial object as a point.

The relative movement amounts can be calculated from all of the input information and a spherical triangle which connects the zenith, a celestial pole and a position of a center of a picture plane on a celestial hemisphere.

More specifically, the method of automatically tracking and photographing a celestial object further includes calculating an angle γ between the horizontal direction and an equator at the celestial object from the following equation (14) from the latitude ε, the azimuth angle A, the elevation angle h, a rotational angle ξ from the horizontal direction and about the optical axis of the photographing optical system as attitude information of the photographic apparatus, and a focal length f of the photographing optical system; and calculating relative movement amounts Δx and Δy of the celestial object image at a predetermined time T with respect to a long-side direction and a short-side direction of the image pickup device from the following equations (III) and (IV), wherein $$\gamma = \arctan\ [\cos(\epsilon) \times \sin(A)/(\sin(\epsilon) \times \cos(h) - \cos(\epsilon) \times \sin(h) \times \cos(A))] \qquad (14),$$

$$\Delta x = x \times \cos(\gamma + \xi) + y \times \sin(\gamma + \xi) \qquad \text{(III), and}$$

$$\Delta y = x \times \sin(\gamma + \xi) + y \times \cos(\gamma + \xi) \qquad \text{(IV),}$$

wherein $$\Delta x = f \times \sin\ \theta \times \sin\ \phi \qquad \text{(10), and}$$

$$\Delta y = f \times \sin\ \theta \times \cos\ \theta(1 - \cos\ \phi) \qquad (11),$$

wherein θ represents an angle between a direction toward a celestial pole and the optical axis of the photographing optical system, and φ represents an angle of rotation of the earth at the predetermined time T.

A celestial-object auto-tracking photographic camera is provided, including an operational device for calculating the relative movement amounts to perform the above-described method of automatically tracking and photographing the celestial object.

In an aspect of the invention, the celestial-object auto-tracking photographic camera includes a mover which moves the image pickup device in a parallel manner in directions orthogonal to an optical axis of the photographing optical system and rotates the image pickup device about an axis parallel to the optical axis based on the calculated relative movement amounts.

In another aspect of the invention, in the celestial-object auto-tracking photographic camera, the predetermined imaging area is a trimmed area which is defined by electronically trimming part of an entire imaging area of the image pickup device, and wherein the celestial-object auto-tracking photographic camera includes a mover which moves the trimmed area in a parallel manner in directions orthogonal to an optical axis of the photographing optical system and rotates the trimmed area about an axis parallel to the optical axis based on the calculated relative movement amounts.

In a further aspect of the invention, in the celestial-object auto-tracking photographic camera, the predetermined imaging area is a trimmed area which is defined by electronically trimming part of an entire imaging area of the image pickup device, and wherein the celestial-object auto-tracking photographic camera includes a mover which moves the celestial object image relative to the photographic apparatus by decentering a portion of the photographing optical system, and rotates the trimmed area about an axis parallel to an optical axis of the photographing optical system based on the calculated relative movement amounts. The term "optical axis of the photographing optical system"

refers to the optical axis of the photographing optical system in an initial state before performing an eccentric adjustment.

In a further aspect of the invention, in the celestial-object auto-tracking photographic camera, the predetermined imaging area is a trimmed area which is defined by electronically trimming part of an entire imaging area of the image pickup device, and the celestial-object auto-tracking photographic camera includes a mover which moves the image pickup device in a parallel manner in directions orthogonal to an optical axis of the photographing optical system and rotates the trimmed area about an axis parallel to the optical axis.

The operational device can calculate the relative movement amounts from all of the input information and a spherical triangle which connects the zenith, a celestial pole and a position of a center of a picture plane on a celestial hemisphere.

More specifically, the operational device calculates an angle γ between horizontal and an equator at the celestial object from the following equation (14) from the latitude ε, the azimuth angle A, the elevation angle h, a rotational angle ξ from the horizontal direction and about the optical axis of the photographing optical system as attitude information of the photographic apparatus, and a focal length f of the photographing optical system, and calculates relative movement amounts Δx and Δy of the celestial object image at a predetermined time T with respect to a long-side direction and a short-side direction of the image pickup device from the following equations (III) and (IV), wherein $$\gamma = \arctan\ [\cos(\epsilon) \times \sin(A)/(\sin(\epsilon) \times \cos(h) - \cos(\epsilon) \times \sin(h) \times \cos(A))] \qquad (14),$$

$$\Delta x = x \times \cos(\gamma + \xi) + y \times \sin(\gamma + \xi) \qquad \text{(III), and}$$

$$\Delta y = x \times \sin(\gamma + \xi) + y \times \cos(\gamma + \xi) \qquad \text{(IV),}$$

wherein $$\Delta x = f \times \sin\ \theta \times \sin\ \phi \qquad \text{(10), and}$$

$$\Delta y = f \times \sin\ \theta \times \cos\ \theta(1 - \cos\ \phi) \qquad (11),$$

wherein θ represents an angle between a direction toward a celestial pole and the optical axis of the photographing optical system, and φ represents an angle of rotation of the earth at the predetermined time T.

Advantageous Effects of the Invention

According to the present invention, in the method of automatically tracking and photographing celestial objects, and a camera that employs this method, it is possible to photograph a still image of a celestial object(s) in a state where each celestial object appears stationary simply by making an exposure with a camera directed toward an arbitrary-selected celestial object and fixed with respect to the ground and without using an equatorial.

DESCRIPTION OF EMBODIMENTS

Figure 1:
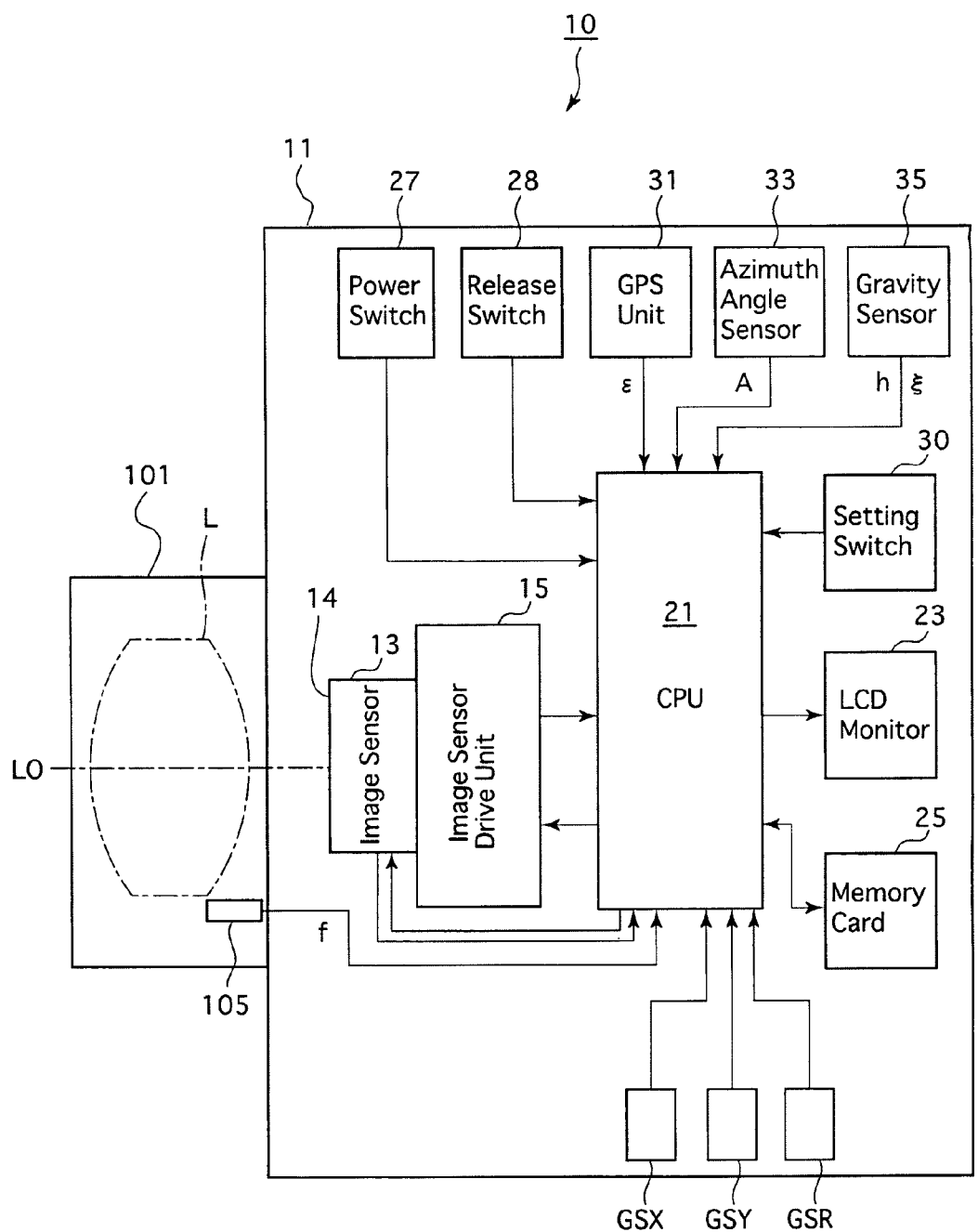
FIG. 1 is a block diagram illustrating main components of an embodiment of a digital camera provided with the function of automatically tracking and photographing celestial objects according to the present invention.

An embodiment of a method of automatically tracking and photographing celestial objects according to the present invention and an embodiment of a digital camera employing this method will be discussed hereinafter. As shown in FIG. 1, the present embodiment of the digital camera 10 (photographic apparatus) is provided with a camera body 11 and a photographing lens 101 (photographing optical system L). An image sensor 13 serving as an image pickup device is installed in the camera body 11 to be positioned behind the photographing optical system L. An optical axis LO of the photographing optical system L is orthogonal to an imaging surface 14 of the image sensor 13. The image sensor 13 is mounted onto an image sensor drive unit (mover) 15. The image sensor drive unit 15 is provided with a fixed stage, a movable stage which is movable relative to the fixed stage, and an electromagnetic circuit for moving the movable stage relative to the fixed stage, and the image sensor 13 is held by the movable stage. The image sensor 13 (the movable stage) is controlled and driven to move in a parallel manner in desired directions orthogonal to the optical axis LO at a desired moving speed and to rotate about an axis parallel to the optical axis LO (instantaneous center at some point in a plane orthogonal to the optical axis) at a desired rotational speed. This type of image sensor drive unit 15 is known in the art as an anti-shake unit of an image shake corrector (shake reduction system) incorporated in a camera disclosed in, e.g., Patent Literature 3.

The camera body 11 is equipped with a CPU 21 which controls the overall operation of the camera. The CPU 21 drives the image sensor 13 and controls the operation thereof, and performs a signal processing operation on an image signal of a captured object image to display this image on an LCD monitor 23, and writes image data of this image onto a memory card 25. To detect vibrations applied to the digital camera 10 when the image sensor drive unit 15 is used as an anti-shake unit, signals detected by an X-direction gyro sensor GSX, a Y-direction gyro sensor GSY and a rotation-sensing gyro sensor GSR are input to the CPU 21.

The camera body 11 is provided with various switches such as a power switch 27, a release switch 28 and a setting switch 30. The CPU 21 performs controls according to the ON/OFF states of these switches 27, 28 and 30. For instance, the CPU 21 turns ON/OFF the power supply from a battery, not shown in the drawings, upon receipt of an operation signal from the power switch 27, and performs a focusing process, a photometering process and an image capturing process (astronomical-image capturing process) upon receipt of an operation signal from the release switch 28. The setting switch 30 is for selectively setting various photography modes (exposure modes) such as a celestial-object tracking photography mode and a normal photography mode.

The camera body 11 is provided therein with a GPS unit 31 serving as a latitude information inputter, an azimuth angle sensor 33 serving as an azimuth information inputter, and a gravity sensor 35 serving as a photographing elevation angle information inputter. Latitude information $\epsilon$, photographing azimuth angle information A, and photographing elevation angle information h are input to the CPU 21 from the GPS unit 31, the azimuth angle sensor 33 and the gravity sensor 35, respectively. In addition, the gravity sensor 35 includes a leveling function and provides attitude information of the camera body 11 shown in FIG. 11 to the CPU 21 (the gravity sensor 35 functions as a camera attitude information inputter). The camera attitude information denotes information $\xi$ on the angle of rotation of the camera body 11 (the image sensor 13) about the optical axis LO from a reference position of the camera body 11 (the image sensor 13). This reference position of the camera body 11 (the image sensor 13) is, e.g., a position (attitude) in which the long-side direction of the image sensor, which is rectangular in shape, is coincident with the horizontal direction (X-direction), and the angle $\xi$ between the horizontal direction (X-direction) and a long-side direction X' after the camera body 11 is rotated corresponds to this rotational angle information.

Each or all of the above described GPS unit 31, azimuth sensor 33 and gravity sensor 35 can be an external type that is attached to the camera body instead of a built-in type that is incorporated into the camera body 11. Specifically, it is possible to install such external devices to an accessory shoe or a bracket attached to the base plate of the camera body 11, and output signals from the external devices can be input to the CPU 21 via electrical contacts on the accessory shoe or a connector such as a USB connector. Date/time information that is input to the CPU 21 can be obtained from a built-in clock, and latitude information $\epsilon$ can be manually input to the CPU 21 by the user via the setting switch 30.

When a celestial-object tracking photographing operation is performed, the CPU 21 controls parallel and rotational movements of the image sensor 13 via the image sensor drive unit 15 based on the latitude information $\epsilon$ that is input from the GPS unit 31, the photographing azimuth angle information A that is input from the azimuth angle sensor 33, the photographing elevation angle information h and the rotational angle information (camera posture information) $\xi$ that are input from the gravity sensor 35, and the focal length information f that is input from a focal length detector 105.

The principle of celestial-object tracking photography using the above described digital camera 10 will be specifically discussed hereinafter.

[Photographing from the North Pole (90 degrees North Latitude)]

Photographing from the north pole on earth (90 degrees latitude) refers to photographing in a state (shown in FIG. 2) where the north star (Polaris), which lies in an extension of the earth's axis (axis of rotation of the earth), is coincident with the zenith.

Figure 2:
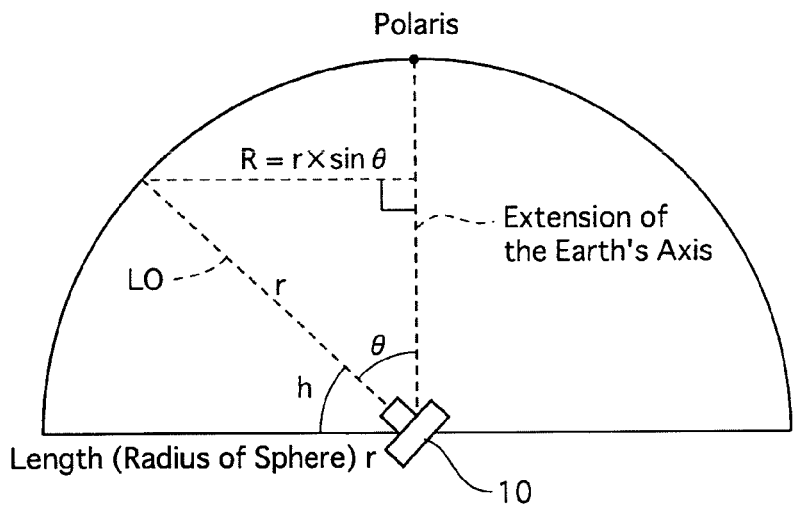
FIG. 2 is a diagram showing a manner of performing a celestial-object photographing operation at the North Pole with the radius of the celestial sphere defined as r.

It is herein assumed that the celestial sphere is an finite sphere, that "r" shown in FIG. 2 represents the radius of the celestial sphere, which is supposed to be infinite in reality, and that "θ" shown in FIG. 2 represents the angle of deviation of the optical axis LO of the photographing optical system L of the digital camera 10 from the north star (i.e., the angle between the direction toward the celestial pole and the optical axis of the photographing optical system). In this case, the photographing elevation angle h of the digital camera 10 is represented by the following formula: 90−θ (h=90−θ).

Figure 3:
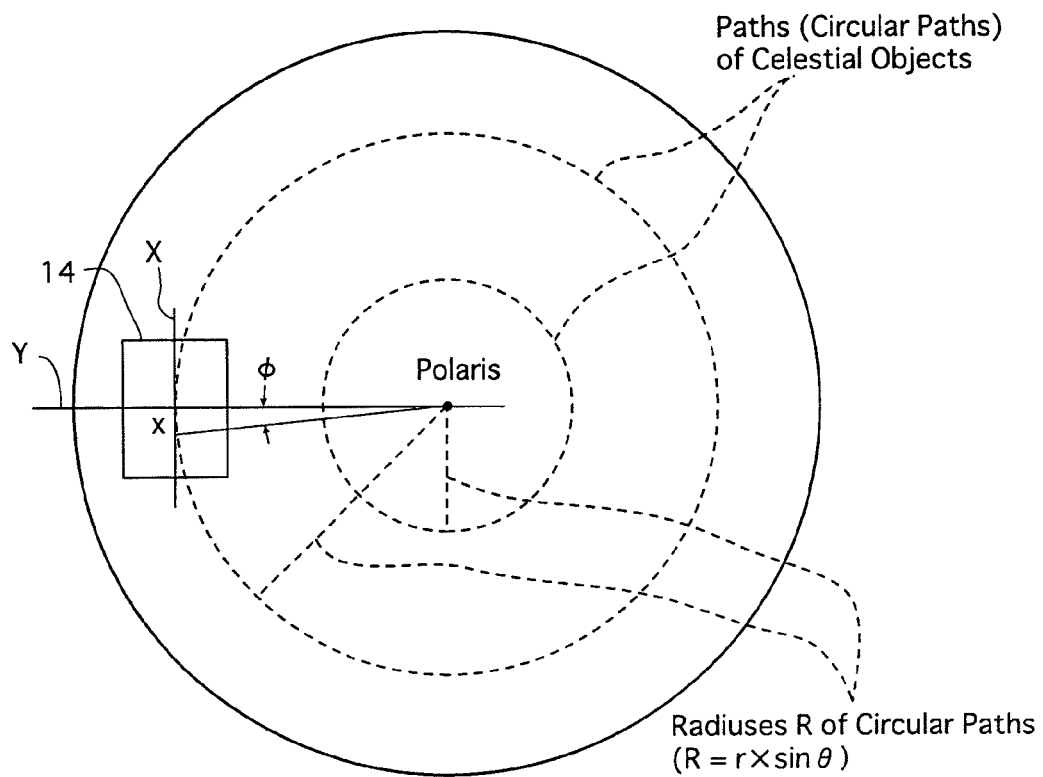
FIG. 3 is diagram illustrating the manner shown in FIG. 2 as viewed from directly below.

When the celestial sphere is viewed from directly below as shown in FIG. 3, each of all the celestial bodies traces a circular path about the north star (celestial pole). The radius of this circular path is designated as R. The radius R of the circular path depends on the photographing elevation angle h of the digital camera 10, thus being capable of being represented by θ. The radius R of the circular path can be given by the following equation:

$$R = r \times \sin \theta \quad (1).$$

In the case where a celestial object rotates by an angle of φ every t seconds on the precondition that the celestial object rotates one revolution along a circular path by an angle of 360 degrees for 24 hours (=1440 minutes=86400 seconds), the following equation is established:

$$\phi = 0.004167 \times t [\deg] \quad (2).$$

Figure 4:
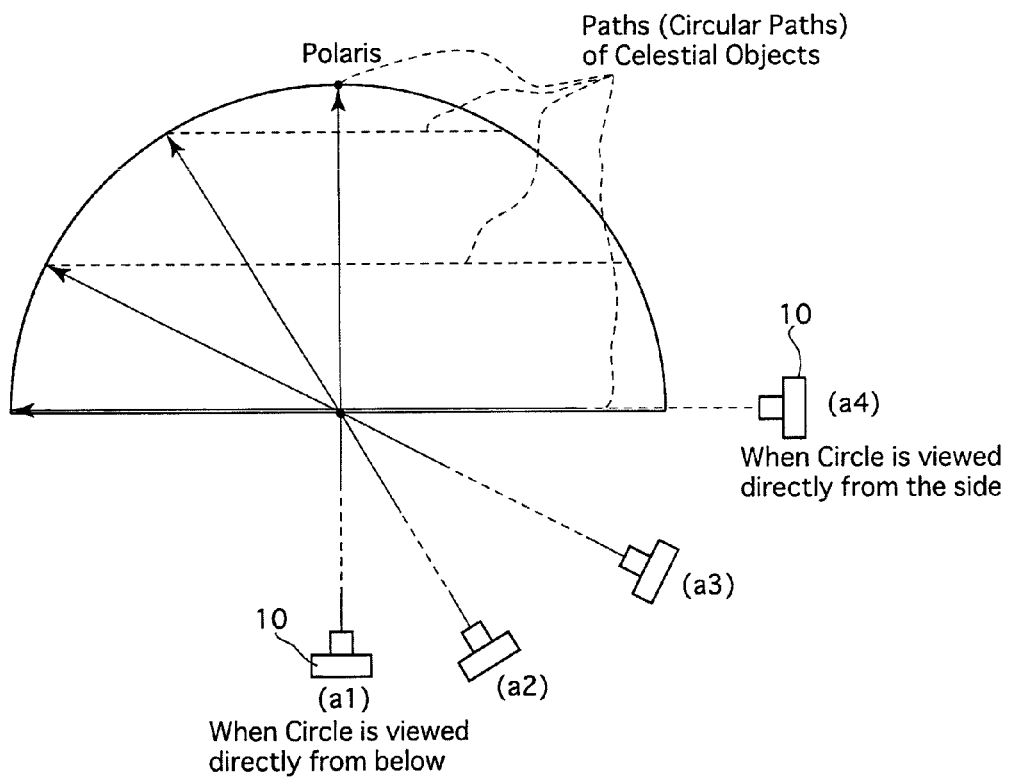
FIG. 4 is a diagram illustrating a path (circular path) of a celestial object viewed from different directions (a1) through (a4)
Figure 5:
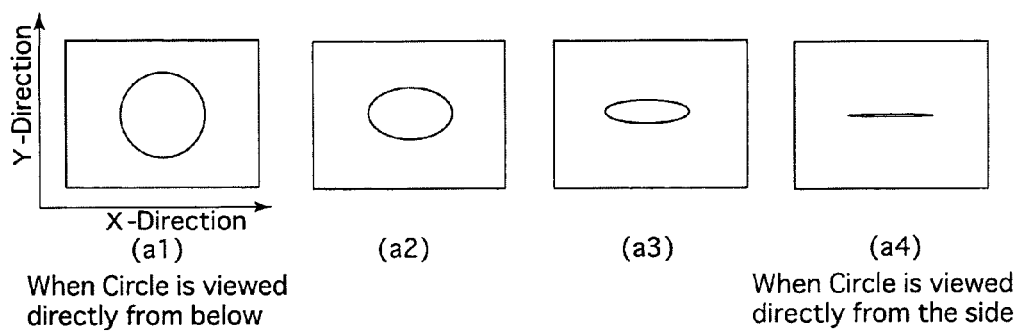
FIG. 5 is a diagram showing images of the circular path of the celestial object which are captured from the different directions (a1) through (a4)

Even if the path that a celestial object traces is circular as shown in FIG. 4, FIG. 5 (a1) shows the image of a circular path of a celestial object as the circular path is viewed from just below, FIGS. 5(a2) and 5(a3) each show the image of the same circular path as the circular path is viewed from an oblique direction, and FIG. 5(a4) shows the image of the same circular path as the circular path is viewed directly from the side, so that the outcome is that the circular path varies in apparent shape depending on the viewing site. Accordingly, although a celestial object appears to move while tracing a circular path, the photographing elevation angle h of the camera exerts an influence on the image formation state of the celestial object when the celestial object is actually photographed with the camera.

Since a circle appears as an ellipse when viewed from an oblique direction, these paths can be determined from the following equations:

$$Xr = R = r \times \sin \theta \quad (3), \text{ and}$$

$$Yr = R \times \cos \theta = r \times \sin \theta \times \cos \theta \quad (4),$$

wherein Xr represents the radius of the long axis of the ellipse, and Yr represents the radius of the short axis of the ellipse.

Figure 6:
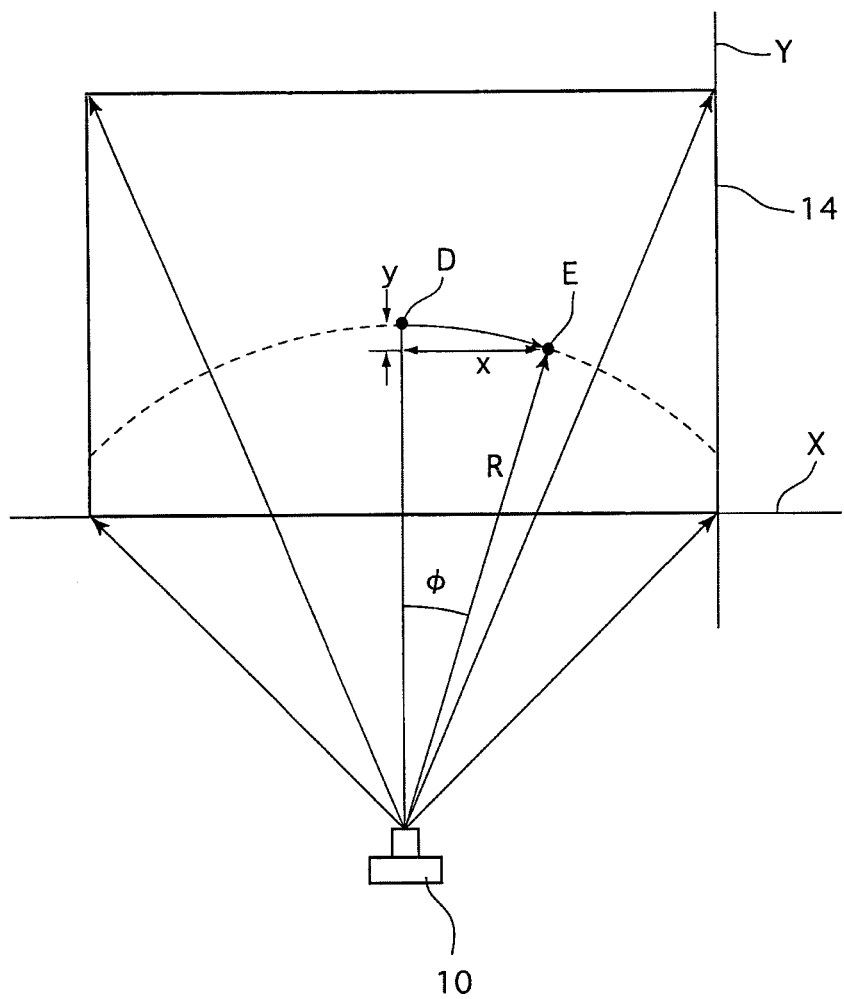
FIG. 6 is a diagram illustrating a path traced by an image of a celestial object due to the earth's rotation with a camera pointed at the celestial object.

Hence, as shown in FIGS. 3, 4 and 6, the path of a celestial object (the earth) when it rotates by an angle of φ° with the digital camera 10 pointed at the celestial object will be described hereinafter by dividing the path into components in the X-direction (direction of parallels of a celestial sphere) and the Y-direction (direction of meridians of the celestial sphere). The amount of movement x in the X-direction will be represented by the following equation:

$$x = R \times \sin \phi \quad (5).$$

The amount of movement y in the Y-direction varies depending on the viewing direction with respect to the circular path.

In FIG. 6, the path of the celestial object shown by an arrow (extending from point D to point E) is in the shape of a perfect circular arc as viewed from directly below (θ=0°), similar to the circular path shown in FIG. 5(a1). In reality, when θ=0, the radius R of the circle is also 0, so that the circle merely appears as a single point; however, the radius R is assumed to be a finite value for the sake of simplicity. In this case, the amount of movement y in the Y-direction becomes maximum.

Additionally, since the amount of movement y in the Y-direction decreases as the path of the celestial object is viewed more obliquely, as shown in FIGS. 5 (a2) and (a3), the amount of movement y in the Y-direction becomes minimum (=0) as the circular path is viewed directly from the side as shown in FIG. 5 (a4). It can be understood from FIG. 6, in which the path of the celestial object is circular arc in shape, that the maximum amount of movement Ymax in the Y-direction is represented by the following equation:

$$Y\max = R - R \times \cos \phi \quad (6).$$

Therefore, the amount of movement y in the Y-direction is represented by the following equation:

$$y = Y\max \times \cos \theta = (R - R \times \cos \phi) \times \cos \theta \quad (7).$$

If equation (1) is substituted into equations (5) and (7), the amount of movement x in the X-direction and the amount of movement y in the Y-direction are represented by the following equations:

$$x = r \times \sin \theta \times \sin \phi \quad (8), \text{ and}$$

$$y = r \times \sin \theta \times \cos \theta (1 - \cos \phi) \quad (9).$$

To perform calculations on a celestial sphere using the actual digital camera 10, the movement amounts Δx, Δy on the imaging surface 14 in the X-direction and the Y-direction projected onto the imaging surface 14 are obtained. The radius r of the celestial sphere that is infinity is expressed by the focal length f of the photographing lens 101, and the movement amounts Δx, Δy are calculated using the following equations:

$$\Delta x = f \times \sin \theta \times \sin \phi \quad (10), \text{ and}$$

$$\Delta y = f \times \sin \theta \times \cos \theta (1 - \cos \phi) \quad (11).$$

Accordingly, the amount of movement of the image sensor 13 in a plane orthogonal the optical axis varies depending on the focal length f of the photographing lens 101 mounted to the digital camera 10.

Figure 7:
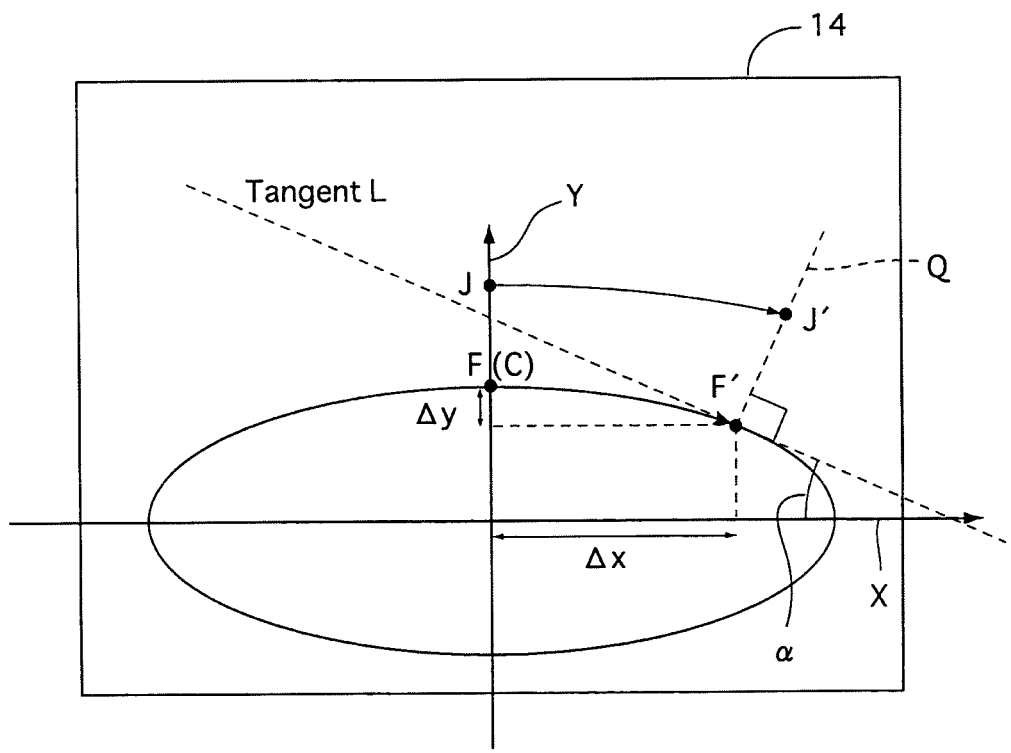
FIG. 7 is a diagram showing a manner of tracking a celestial object while capturing the celestial object at the center of the image sensor when the celestial object moves while tracing an apparent elliptic (circular) path.

Subsequently, it is determined how much the image sensor 13 should rotate about the center thereof at a time of exposure. As described above, the path of a celestial object appears as a circular path or an elliptical path as viewed from the digital camera 10. When the celestial object shown as a point F in FIG. 7 moves while tracing an elliptical (circular) path as shown in FIG. 7, the center C of the imaging surface 14 of the image sensor 13 only needs to be moved in the X-direction and the Y-direction by the movement amounts Δx and Δy if the digital camera 10 is made to follow the movement from the point F to a point F' with the point F captured at the center of the image sensor 13 (that corresponds to the center C of the imaging surface 14). However, in the case where, e.g., a celestial object J exists in the vicinity of the point F, the point J moves to a point J'. To make the digital camera 10 follow the point J also, the image sensor 13 only needs to be rotated about the center C of the image sensor 13. The angle of this rotation of the image sensor 13 corresponds to the angle α of the inclination of a tangent L to the ellipse at the point F' (i.e., the angle between a tangent to the ellipse at the point F and the tangent to the ellipse at the point F'). In the following descriptions, the long-side direction and the short-side direction of the image sensor 13 are defined as an X-axis and a Y-axis, respectively.

Figure 8:
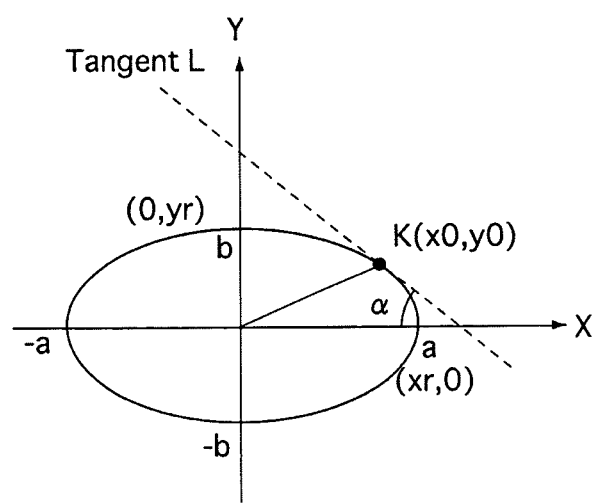
FIG. 8 is a diagram illustrating a relationship between an ellipse and a tangent line to the ellipse.

In an X-Y coordinate system and an ellipse like those shown in FIG. 8, the equation of the tangent L to the ellipse at a point K is expressed by the following equation:

$$x0 \times x/a^2 + y0 \times y/b^2 = 1.$$

In FIG. 8, a point "a" and a point "b" correspond to the radius Xr of the long axis in the equation (3) and the radius Yr of the short axis in the equation (4), respectively.

If the aforementioned equation of the tangent L is modified into an equation for Y (Y=), the following equation is obtained:

$$Y = -(b^2 \times x0)/(a^2 \times y0) \times x - 1/(a^2 \times y0).$$

The angle between the tangent L to this ellipse and the X-axis corresponds to the rotational angle α of an image about the center thereof.

The inclination of a straight line Q orthogonal to the tangent L to the ellipse is expressed by the following expression:

$$-(b^2 \times x0)/(a^2 \times y0).$$

Accordingly, the rotational angle α which is to be determined is obtained by the following equation:

$$\alpha = \arctan(-(b^2 \times x0)/(a^2 \times y0)) \qquad (12).$$

[Latitude Other than 90°]

The above descriptions are directed to the case where the latitude of a photographic site is 90 degrees (namely, the north star (celestial pole) is right above the camera). Next, the case where the latitude at a photographic site is other than 90° will be hereinafter discussed with reference to FIGS. 9 and 10.

Figure 9:
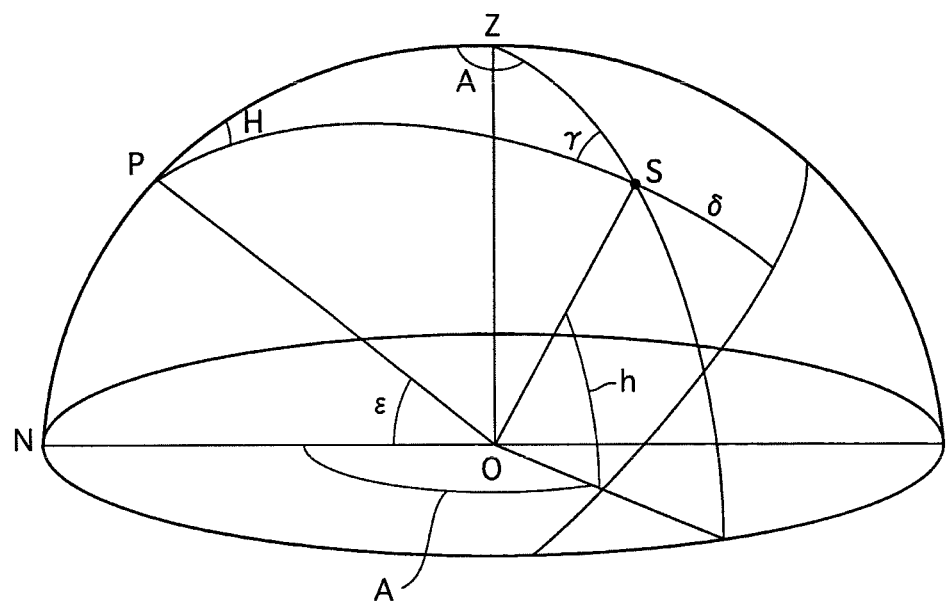
FIG. 9 is a celestial chart illustrating celestial-object auto-tracking photography according to the present invention.

In FIG. 9, which shows a manner of astrophotography in the Northern Hemisphere, each designator is defined as follows:

P: celestial pole,
Z: zenith,
N: true north,
S: target celestial object (photographic target point) (for the purpose of illustration, this target celestial object (star) shall correspond to the center of the imaging surface 14 and shall be positioned on an extension of the optical axis LO of the photographing lens 101. However, the optical axis, of course, does not need to be made coincident with any celestial object during an astrophotographing operation),
ε: latitude at a photographic site,
A: photographing azimuth angle (azimuth angle of the target celestial object S, at which the photographing lens 101 is pointed, or azimuth angle of the point of intersection between the optical axis LO of the photographing lens 101 and the celestial sphere),
h: photographing elevation angle (altitude of the target celestial object S, at which the photographing lens 101 is pointed, or altitude of the point of intersection between the optical axis LO of the photographing lens 101 and the celestial sphere),
H: hour angle of the target celestial object S (time is normally used as the unit of hour angle; however, hour angle shall be herein converted into an angle (1 hour=15 degrees)),
δ: declination of the target celestial object S, and
γ: the angle between a curved line which connects the celestial pole P and the target celestial object S to each other by the shortest distance and a curved line which connects the zenith Z and the target celestial object (star) S to each other by the shortest distance.

In FIG. 9, if ∠POS, which is the angle between Polaris and the target point S, can be determined, the path of the celestial object can be determined by substituting ∠POS for the angle θ shown in FIG. 2.

Figure 10:
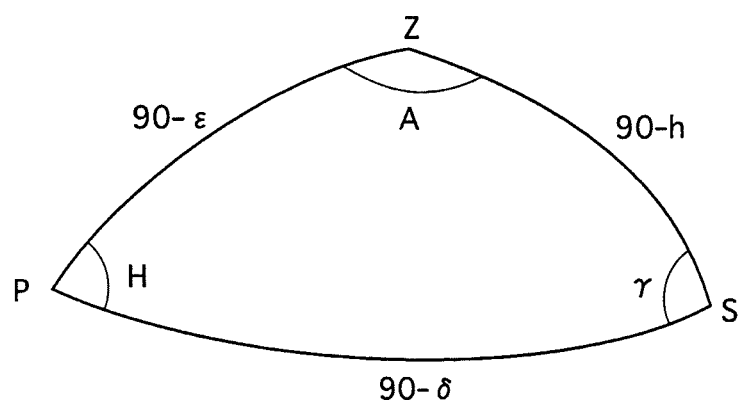
FIG. 10 is a diagram illustrating a spherical triangle on the said celestial chart which connects the north pole, a target celestial object and the zenith.

∠POS is equal to the length of a curved line PS shown in FIG. 10 in the case where the radius of the sphere is assumed to be 1. Therefore, the following equation is obtained using the law of cosines for triangles:

$$\cos(\angle POS) = \cos(90-\epsilon) \times \cos(90-h) + \sin(90-\epsilon) \times \sin(90-h) \times \cos(A) = \sin(\epsilon) \times \sin(h) + \cos(\epsilon) \times \cos(h) \times \cos(A),$$

and accordingly, ∠POS is expressed by the following equation:

$$\angle POS = \arccos[\sin(\epsilon) \times \sin(h) + \cos(\epsilon) \times \cos(h) \times \cos(A)] \qquad (13).$$

Therefore, if ∠POS is substituted for θ in the equations (8) through (11), the amount of movement x and the amount of movement y of a celestial object in the X-direction and the Y-direction at a given latitude ε can be determined.

In addition, a correction needs to be made to the moving direction depending on the camera attitude. In the case where the camera is turned upward by the photographic elevation angle h to be pointed at the target celestial object S with the camera held horizontally, the angle between a horizontal surface and the equator at the target celestial object becomes γ. As described above, the camera attitude corresponds to the angle of rotation of the digital camera 10 about the optical axis LO, and the camera attitude when the lengthwise direction of the imaging surface 14 is horizontal is designated as a horizontal attitude of the camera.

From the law of sines for triangles, the following equation is obtained:

$$\tan(\gamma) = \sin(90-\epsilon) \times \sin(A)/(\cos(90-\epsilon) \times \sin(90-h) - \sin(90-\epsilon) \times \cos(90-h) \times \cos(A)) = \cos(\epsilon) \times \sin(A)/(\sin(\epsilon) \times \cos(h) - \cos(\epsilon) \times \sin(h) \times \cos(A)),$$

and accordingly, γ is expressed by the following equation:

$$\gamma = \arctan[\cos(\epsilon) \times \sin(A)/(\sin(\epsilon) \times \cos(h) - \cos(\epsilon) \times \sin(h) \times \cos(A))] \qquad (14).$$

Accordingly, to convert the amount of movement x and the amount of movement y of a celestial object in the X-direction and the Y-direction into an amount of lateral movement Δx and an amount of vertical movement Δy in an X-Y coordinate system (row-and-column coordinate system of the camera (image sensor)) on the imaging surface 14 using the above calculated γ, the following equations (I) and (II) are used:

$$\Delta x = x \times \cos(\gamma) + y \times \sin(\gamma) \qquad (I), \text{ and}$$

$$\Delta y = x \times \sin(\gamma) + y \times \cos(\gamma) \qquad (II).$$

Figure 11:
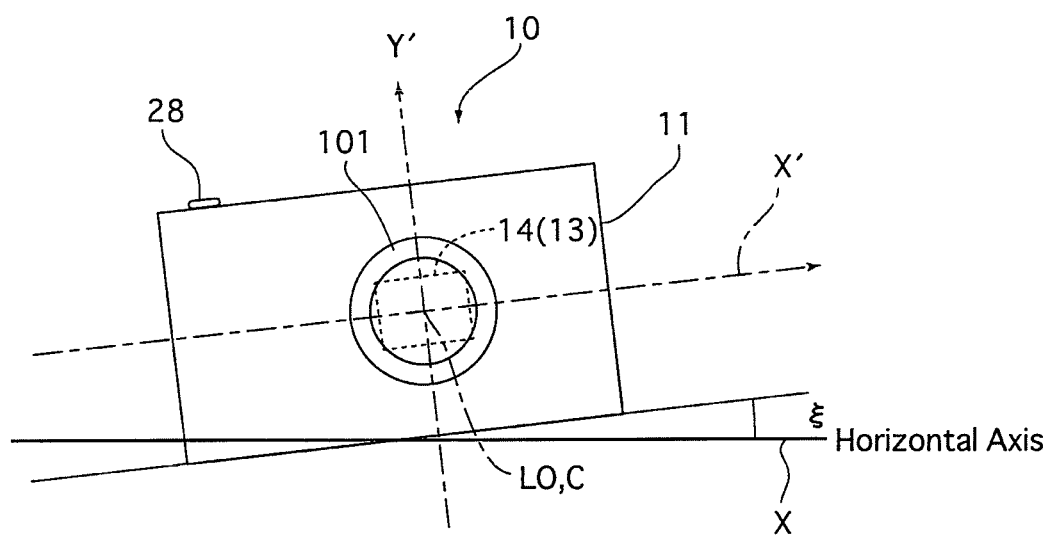
FIG. 11 is a diagram showing a state where the digital camera is inclined from a horizontal position about the photographing optical axis.

Additionally, in the case where the attitude of the digital camera 10 is such that the image sensor 13 is inclined with respect to the horizontal direction (has been rotated from the horizontal direction) at the angle ξ about the optical axis LO of the photographing lens 101 as shown in FIG. 11, the amount of lateral movement Δx and the amount of vertical movement Δy of the image sensor 13 can be corrected according to the following equations (III) and (IV):

$$\Delta x = x \times \cos(\gamma + \xi) + y \times \sin(\gamma + \xi) \quad \text{(III), and}$$

$$\Delta y = x \times \sin(\gamma + \xi) + y \times \cos(\gamma + \xi) \quad \text{(IV).}$$

The aforementioned amount of lateral movement Δx, amount of vertical movement Δy and rotational angle α of the image sensor 13 are calculated in a manner which will be discussed hereinafter.

The direction toward the north celestial pole P of the celestial sphere can be regarded to be invariant regardless of date and time, thus being capable of being calculated from the latitude at a photographic site. In addition, the direction toward the zenith Z can also be calculated from the latitude. Accordingly, first of all, after composition is determined, the digital camera 10 is fixedly installed so that the target celestial object(s) is projected onto the imaging surface 14. In this composition with the digital camera 10, the GPS unit 31 inputs the latitude information ε at a photographic site to the CPU 21, the azimuth angle sensor 33 inputs the photographing azimuth angle information A to the CPU 21, and the gravity sensor 35 inputs the photographing elevation angle information h and the rotational angle information (camera attitude information) ξ to the CPU 21. The CPU 21 determines, from this input information, the points of the zenith Z, the celestial pole P, and the target celestial object S at the center of the picture plane as shown in FIGS. 9 and 10.

Upon determining the above three points Z, P and S, the CPU 21 calculates the amount of lateral movement Δx, the amount of vertical movement Δy and the rotational angle amount α of the image sensor 13 from the focal length information f of the photographing lens 101, which is input from the focal length detector 105, and the rotational angle information (camera attitude information) ξ. The CPU 21 performs an exposure operation while controlling the parallel movement and the rotational movement of the image sensor 13 in accordance with a moving path based on the calculated rotational angle amount α, amount of lateral movement Δx and amount of vertical movement Δy (at this time, the orientation of the digital camera 10 is fixed), which makes celestial-object tracking photography possible.

As described above, in the digital camera 10 that is equipped with the image sensor drive unit 15, which is configured to be capable of moving the image sensor 13 in the X and Y directions and also rotating the image sensor 13 in a plane orthogonal to the optical axis LO, the above-described celestial-object tracking photography can be mechanistically achieved with the camera body 11 fixed with respect to the ground by making only the image sensor 13 move in a predetermined direction while tracing a predetermined path.

On the other hand, mechanical movement limits exist in the range of movement of the image sensor 13, which is defined by the image sensor drive unit 15. Exposure time is limited by these mechanical movement limits. Among the mechanical movement limits, if mechanical movement limits in the X-direction and the Y-direction and a mechanical rotational limit are represented by Lx, Ly and Lα, respectively, periods of times Tlimit until the image sensor 13 reaches the aforementioned mechanical movement limits and the mechanical rotational limit, can be calculated by substituting Lx, Ly and Lα into Δx, Δy and a in the equations (12), (III) and (IV), and back-calculating T from the equations (12), (III) and (IV), respectively. The periods of times Tlimit for Δx, Δy and α thus obtained are designated as Tlimit(Δx), Tlimit(Δy) and Tlimit(Δα), respectively. Among the aforementioned three times Tlimit(Δx), Tlimit(Δy) and Tlimit(Δα), the smallest value is designated as a longest exposure time Tlimit that is limited by the mechanical limits.

Figure 12:
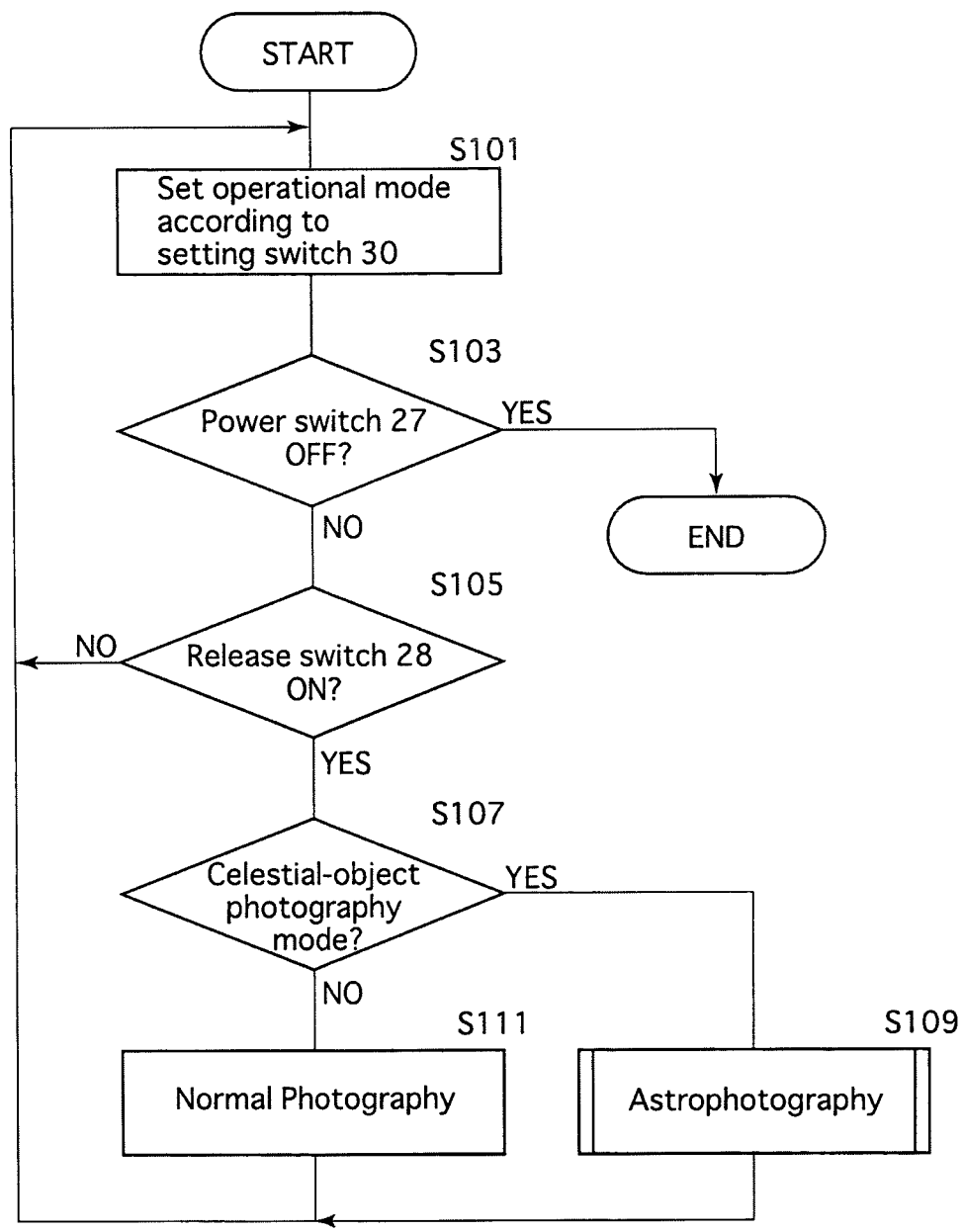
FIG. 12 is a flowchart showing a main process relating to celestial-object auto-tracking photography.
Figure 13:
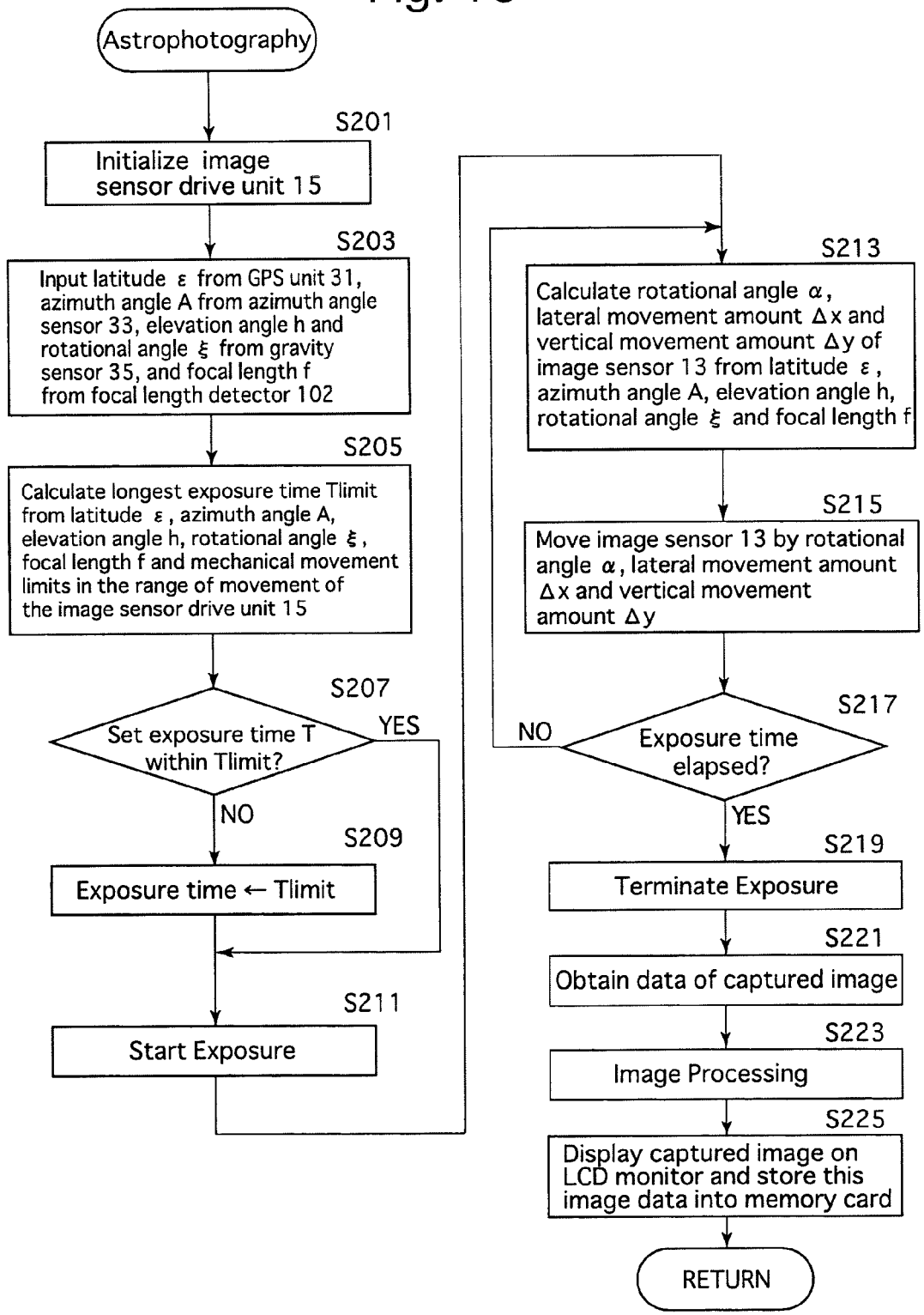
FIG. 13 is a flow chart illustrating the celestial-object auto-tracking photography.

Astrophotography (celestial-object tracking photography) using the digital camera 10 will be hereinafter discussed with reference to the flow charts shown in FIGS. 12 and 13. As shown in FIG. 12, in a state where a normal photography mode has been set by the setting switch 30 and the power switch 27 is ON (S101, S103: NO), a normal photographing operation (normal exposure operation) is performed by tuning ON the release switch 28 (S105: YES, S107: NO, S111). The photographing operation ends upon the power switch 27 being turned OFF (S103: YES). No photographing operation is performed unless the release switch 28 is turned ON (S105: NO). This photographing operation is the same as that performed in typical digital cameras.

On the other hand, in a state where the celestial-object tracking photography mode is set by the setting switch 30 and the power switch 27 is in the ON state (S101, S103: NO), the celestial-object tracking photographing operation according to the present embodiment is performed upon the release switch 28 being turned ON with a target celestial object(s) (or star(s)) (FIGS. 9 and 10) captured on the imaging surface 14 of the image sensor 13 (S105: YES, 107: YES, S109). At this time, an exposure time T of an arbitrary long period of time is set to the camera by the user. In the case where the digital camera 10 is equipped with an AF system and an AF-capable photographing lens 101, it is desirable that focus be fixed at infinity (or that the camera perform an operation urging the user to set focus of the camera at infinity). At least, it is desirable that a focusing process to bring an object at infinity into focus be performed before a celestial-object tracking photographing process.

Next, the celestial-object tracking photographing operation (step S109) in the present embodiment will be hereinafter discussed in detail with reference to the flow chart shown in FIG. 13.

Upon control entering the celestial-object tracking photographing process, initialization of the image sensor drive unit 15 has been performed while the image sensor 13 is held with the center C of the imaging surface 14 coincident with the optical axis LO(S201).

In this initialized state, the CPU 21 inputs the latitude information ε from the GPS unit 31, the photographing azimuth angle information A from the azimuth angle sensor 33, the photographing elevation angle information h and the rotational angle information (camera attitude information) ξ from the gravity sensor 35, and the focal length information f from the focal length detector 105 (S203).

Subsequently, the CPU 21 calculates a longest exposure time (exposure time limit) Tlimit according to the input latitude information ε, photographing azimuth angle information A, photographing elevation angle information h, rotational angle information (camera attitude information) ξ and focal length information f, and also the mechanical movement limits in the range of movement of the image sensor 13, which is defined by the image sensor drive unit 15 (S205).

Subsequently, the CPU 21 determines whether or not the exposure time T, which is arbitrarily set by the user, is within (less than or equal to) the longest exposure time Tlimit (step S207). If the exposure time T is determined as being within the longest exposure time Tlimit, the CPU 21 sets the exposure time T as an exposure time for the celestial-object tracking photographing operation (S207: YES). On the other hand, if the exposure time T exceeds the longest exposure time Tlimit (S207: NO), the CPU 21 sets the longest exposure time Tlimit as an exposure time for the celestial-object tracking photographing operation (step S209). Subsequently, the CPU 21 controls the operation of a shutter, not shown in the drawings, so that the shutter opens for the set exposure time to start capturing an image via the image sensor 13 (step S211). Although an image is normally captured with an adjustable diaphragm fully open, the aperture size of the diaphragm can be arbitrarily set by the user.

The CPU 21 determines the positions of a point of the zenith Z, a point of the celestial pole P and a point of a celestial object S at the center of the picture plane from the latitude information ε that is input from the GPS unit 31, the photographing azimuth angle information A that is input from the azimuth angle sensor 33, and the photographing elevation angle information h and the rotational angle information (camera attitude information) ξ that are input from the gravity sensor 35 (FIGS. 9 and 10). The CPU 21 calculates the rotational angle α, the amount of lateral movement Δx and the amount of vertical movement Δy of the image sensor 13 from the determined points Z, P and S, the focal length information f of the photographing lens 101, which is input from the focal length detector 105, and the rotational angle information (camera attitude information) ξ (S213).

Subsequently, until the set exposure time elapses, the CPU 21 continues the exposure operation while controlling the parallel movement and the rotational movement of the image sensor 13 in accordance with a moving path based on the calculated rotational angle amount α, amount of lateral movement Δx and amount of vertical movement Δy (S215, S217: NO). This makes capturing of a still image of a celestial object or objects possible in a state where each celestial object appears stationary simply by performing a long astrophotographic exposure with the digital camera 10 fixed. During this exposure time, the CPU 21 calculates and updates the calculated rotational angle amount α, amount of lateral movement Δx and amount of vertical movement Δy of the image sensor 13 a plurality of times in accordance with the elapsed time from the commencement of exposure within the set exposure time. Depending on the computing speed of the CPU 21, the moving cycle (frequency) and the amount of available memory, it is possible that movement data within the entire exposure time be calculated and stored in memory beforehand at the commencement of exposure and that movement of the image sensor 13 be controlled by reading out the movement data from memory in accordance with the elapsed time from the commencement of exposure every time the image sensor 13 is moved. This control eliminates the necessity for calculating and updating the calculated rotational angle amount α, amount of lateral movement Δx and amount of vertical movement Δy of the image sensor 13 during the exposure time.

Subsequently, after a lapse of the exposure time T (S217: YES), the CPU 21 closes the shutter (not shown) to terminate the exposure operation (step S219). Thereafter, the CPU 21 reads out image data on the captured image from the image sensor 13 (step S221), and performs image processing operations such as a white balance adjustment operation and an image processing operation for converting the format type into a predetermined type of format (step S223). Lastly, the CPU 21 causes the image data on the captured image, on which the aforementioned image processing operations have been performed, to be displayed on the LCD monitor 23, and stores this image data into the memory card 25 as an image file of a predetermined format (step S225).

As described above, according to the above described embodiment of the method of automatically tracking and photographing celestial objects according to the present invention and the above described embodiment of the digital camera employing this method, the following operations are provided: inputting the latitude information ε at a photographic site, the photographing azimuth angle information A, the photographing elevation angle information h, the attitude information ξ of the photographic apparatus and the focal length information f the photographing lens 101; calculating the movement amounts (the rotational angle amount α, the amount of lateral movement Δx and the amount of vertical movement Δy) of an image of a celestial object(s) relative to the digital camera (photographic apparatus) 10, which are for fixing the image of the celestial object(s) with respect to a predetermined imaging area of the image sensor 13, using all the input information (ε, A, h, ξ and f); and obtaining a photographic image by moving at least one of the predetermined imaging area and the celestial object image based on the calculated relative movement amounts (the rotational angle amount α, the amount of lateral movement Δx and the amount of vertical movement Δy). This allows celestial-object auto-tracking photography in which celestial object images are not captured as light trails even in a long exposure with the digital camera 10 fixed possible because the image sensor 13 is moved so that a celestial object image(s) on the image sensor 13 does not move in accordance with movement of celestial bodies, i.e., because the image sensor 13 is moved in synchronization with diurnal motion.

In the case where an exposure operation is performed immediately after the amount of movement of the image sensor 13 is calculated without changing the attitude of the digital camera (photographic apparatus) 10, drive data for the longest exposure time Tlimit can be calculated beforehand by performing the process (S213) of calculating the rotational angle α, the amount of lateral movement Δx and the amount of vertical movement Δy of the image sensor 13 before the commencement of the exposure operation (before S211). Thereafter, a configuration is possible in which this drive data is stored in an internal memory of the camera and that this data is sequentially read out from the internal memory of the camera during exposure to control movement of the image sensor 13 via the image sensor drive unit 15.

In the above described embodiment, the image sensor 13 is physically moved in a parallel manner and rotated under the drive control of the image sensor drive unit 15 by the CPU 21. However, it is possible to define a predetermined imaging area of the image sensor 13 as a trimmed area which is defined by electronically trimming part of the entire imaging area (the entire area of the imaging surface 14) of the image sensor 13, and to perform a photographing operation while moving this trimmed area in a parallel manner in directions orthogonal to the optical axis LO of the photographing optical system 101 and rotating the same trimmed area about an axis parallel to the optical axis LO based on the calculated relative movement amounts (the rotational angle amount α, the amount of lateral movement Δx and the amount of vertical movement Δy) to photograph a celestial object(s) as a point(s). In this case, by sending a trimming command signal to the image sensor 13 by the CPU 21 in FIG. 1, it is possible to perform a photographing operation while moving the trimmed area of the image sensor 13 in a parallel manner in directions orthogonal to the optical axis LO of the photographing optical system 101 and also rotating the same trimmed area of the image sensor 13 about an axis parallel to the optical axis LO.

Figure 14:
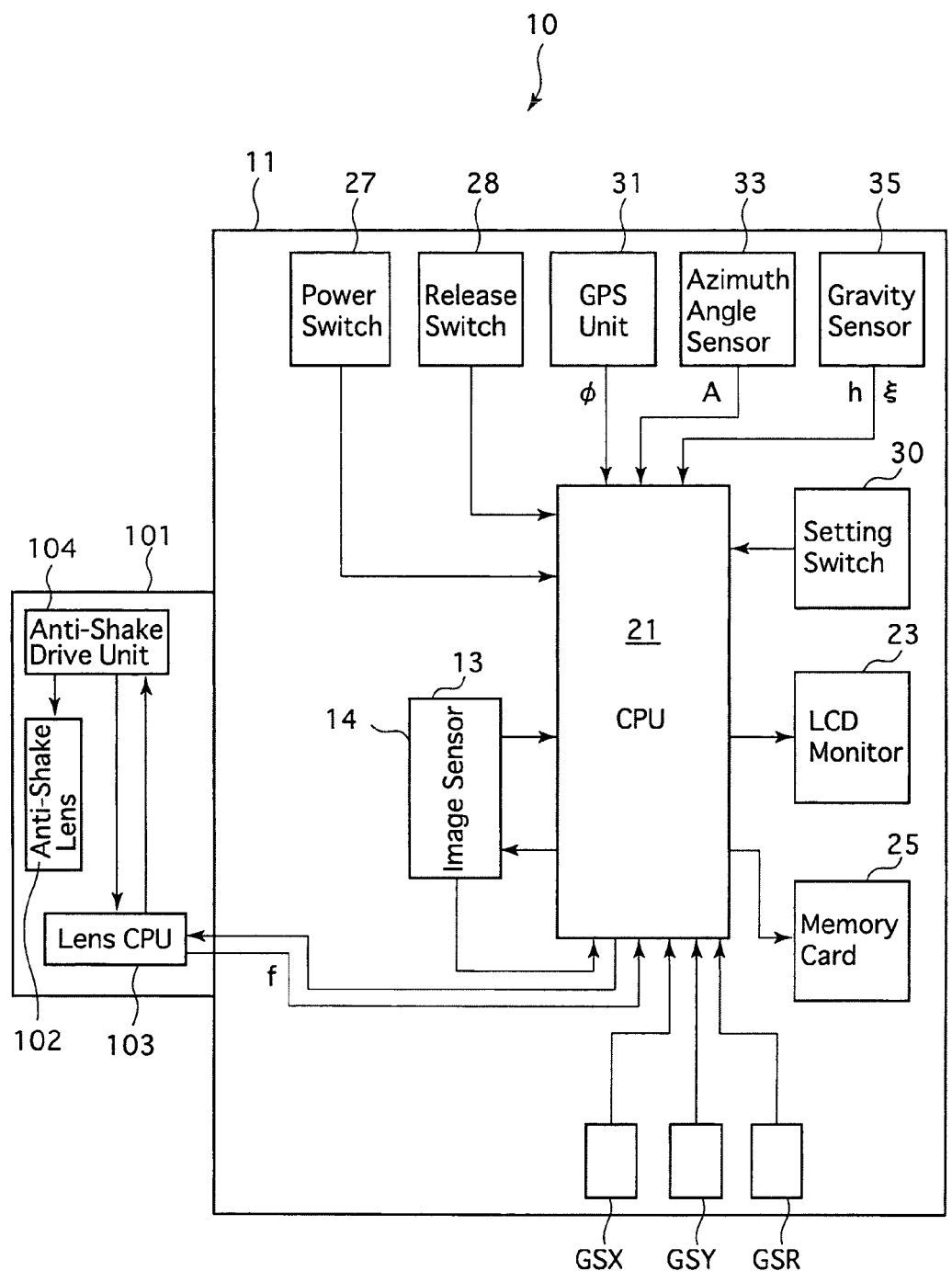
FIG. 14 is a block diagram, which corresponds to the block diagram shown in FIG. 1, illustrating main components of another embodiment of the digital camera provided with the function of automatically tracking and photographing celestial objects, according to the present invention.

Although the above-described digital camera 10 is equipped with the image sensor drive unit 15 that moves the image sensor 13 in directions orthogonal to the optical axis and rotates the image sensor 13 about an axis parallel to the optical axis, a digital camera according to the present invention can be achieved even if the image sensor drive unit 15 is omitted and a configuration is provided with a combination of an image shake corrector installed in the photographing lens 101 with an image shake correction lens (anti-shake lens) 102 for moving the position of an object image on the image sensor 13, and an image sensor rotating mechanism which rotates the image sensor or a system which rotates and moves the trimmed area. FIG. 14 shows this embodiment; in this embodiment, a lens CPU 103 controls and drives the image shake correction lens 102 in directions orthogonal to the optical axis via an anti-shake drive unit 104 by sending an anti-shake drive command signal to the lens CPU 103 of the photographing lens 101 by the CPU 21. On the other hand, by sending a rotation command signal to the image sensor 13 at predetermined drive intervals by the CPU 21, the image sensor is made to rotate about an axis parallel to the optical axis LO. Alternatively, by sending a trimming command signal to the image sensor 13 by the CPU 21 at predetermined drive intervals, the trimmed area of the image sensor 13 is made to rotate about an axis parallel to the optical axis LO.

In addition, a digital camera has been described above as a camera according to the present invention; however, the present invention is applicable to not only lens-interchangeable SLR digital cameras and lens shutter type compact digital cameras, but also to a general photographic apparatus in which an imaging device (image pickup device) can be driven to move in any given direction orthogonal to an optical axis and rotate in a plane orthogonal to the optical axis.

INDUSTRIAL APPLICABILITY

A method of automatically tracking and photographing celestial objects and a camera employing this method are suitable for use in photographing celestial objects that move relative to a photographic apparatus due to diurnal motion.

REFERENCE SIGNS LIST

10 Digital camera (photographic apparatus)
11 Camera body
13 Image sensor (image pickup device)
14 Imaging surface
15 Image sensor drive unit (mover)
21 CPU (operational device)
23 LCD monitor
25 Memory card
28 Release switch
30 Setting switch
31 GPS unit (latitude information inputter)
33 Azimuth sensor (azimuth information inputter)
35 Gravity (level) sensor (photographing elevation angle information inputter/camera attitude information inputter)
101 Photographing lens (photographing optical system)
102 Image shake correction lens (anti-shake lens)
103 Lens CPU
104 Anti-shake drive unit
GSX X-direction gyro sensor
GSY Y-direction gyro sensor
GSR Rotation-sensing gyro sensor

The invention claimed is:

1. A method of automatically tracking and photographing a celestial object which moves relative to a photographic apparatus due to diurnal motion so that a celestial object image, which is formed on an imaging surface of an image pickup device via a photographing optical system, becomes stationary relative to a predetermined imaging area of said imaging surface of said image pickup device during a tracking and photographing operation, said method comprising:

inputting, latitude information at a photographic site, photographing azimuth angle information, photographing elevation angle information, attitude information of said photographic apparatus via a sensor, and focal length information of said photographing optical system;

calculating movement amounts of said celestial object image relative to said photographic apparatus for fixing said celestial object image with respect to said predetermined imaging area of said image pickup device, using all of the input information; and obtaining a photographic image by moving, after start of a shutter release operation, at least one of said predetermined imaging area and said celestial object image based on said calculated relative movement amounts, wherein the attitude information of the photographic apparatus includes rotational angle information which indicates a rotational angle, about the optical axis of the photographing optical system, of one of the photographic apparatus and the image pickup device.

2. The method of automatically tracking and photographing a celestial object according to claim 1, further comprising obtaining a photographic image while moving said image pickup device in a parallel manner in directions orthogonal to the optical axis of said photographing optical system and rotating said image pickup device about an axis parallel to the optical axis based on said calculated relative movement amounts to photograph said celestial object as a stationary object.

3. The method of automatically tracking and photographing a celestial object according to claim 1, wherein said predetermined imaging area is a trimmed area which is defined by electronically trimming part of an entire imaging area of said image pickup device, said method further comprising obtaining a photographic image while, based on said calculated relative movement amounts, moving said trimmed area in a parallel manner in directions orthogonal to the optical axis of said photographing optical system and rotating said trimmed area about an axis parallel to the optical axis to photograph said celestial object as a stationary object.

4. The method of automatically tracking and photographing a celestial object according to claim 1, wherein said predetermined imaging area is a trimmed area which is defined by electronically trimming part of an entire imaging area of said image pickup device, said method further comprising obtaining a photographic image while, based on said calculated relative movement amounts, moving said celestial object image relative to said photographic apparatus by decentering a portion of said photographing optical system, and rotating said trimmed area about an axis parallel to the optical axis of said photographing optical system to photograph said celestial object as a stationary object.

5. The method of automatically tracking and photographing a celestial object according to claim 1, wherein said predetermined imaging area is a trimmed area which is defined by electronically trimming part of an entire imaging area of said image pickup device, said method further comprising obtaining a photographic image while, based on said calculated relative movement amounts, moving said image pickup device in a parallel manner in directions orthogonal to the optical axis of said photographing optical system and rotating said trimmed area about an axis parallel to the optical axis to photograph said celestial object as a stationary object.

6. The method of automatically tracking and photographing a celestial object according to claim 1, wherein said relative movement amounts are calculated from all of the input information and a spherical triangle which connects the zenith, a celestial pole and a position of a center of a picture plane on a celestial hemisphere.

7. The method of automatically tracking and photographing a celestial object according to claim 6, further comprising:

calculating an angle γ between the horizontal direction and an equator at said celestial object from the equation $$\gamma = \arctan[\cos(\epsilon) \times \sin(A)/(\sin(\epsilon) \times \cos(h) - \cos(\epsilon) \times \sin(h) \times \cos(A))]$$

from said latitude ε, said azimuth angle A, said elevation angle h, a rotational angle ξ from the horizontal direction and about said optical axis of the photographing optical system as attitude information of said photographic apparatus, and a focal length f of said photographing optical system; and calculating relative movement amounts Δx and Δy of said celestial object image at a predetermined time T with respect to a long-side direction and a short-side direction of said image pickup device from the following equations, $$\Delta x = x \times \cos(\gamma + \xi) + y \times \sin(\gamma + \xi), \text{ and}$$

$$\Delta y = x \times \sin(\gamma + \xi) + y \times \cos(\gamma + \xi),$$

wherein $$\Delta x = f \times \sin\theta \times \sin\phi, \text{ and}$$

$$\Delta y = f \times \sin\theta \times \cos\theta(1 - \cos\phi)$$

wherein θ represents an angle between a direction toward a celestial pole and the optical axis of said photographing optical system, and φ represents an angle of rotation of the earth at said predetermined time T.

8. A celestial-object auto-tracking photographic camera comprising an operational device for calculating said relative movement amounts to perform said method of automatically tracking and photographing said celestial object according to claim 1.

9. The celestial-object auto-tracking photographic camera according to claim 8, comprising a mover which moves said image pickup device in a parallel manner in directions orthogonal to the optical axis of said photographing optical system and rotates said image pickup device about an axis parallel to the optical axis based on said calculated relative movement amounts.

10. The celestial-object auto-tracking photographic camera according to claim 8, wherein said predetermined imaging area is a trimmed area which is defined by electronically trimming part of an entire imaging area of said image pickup device, and wherein said celestial-object auto-tracking photographic camera comprises a mover which moves said trimmed area in a parallel manner in directions orthogonal to the optical axis of said photographing optical system and rotates said trimmed area about an axis parallel to the optical axis based on said calculated relative movement amounts.

11. The celestial-object auto-tracking photographic camera according to claim 8, wherein said predetermined imaging area is a trimmed area which is defined by electronically trimming part of an entire imaging area of said image pickup device, and wherein said celestial-object auto-tracking photographic camera comprises a mover which moves said celestial object image relative to said photographic apparatus by decentering a portion of said photographing optical system, and rotates said trimmed area about an axis parallel to the optical axis of said photographing optical system based on said calculated relative movement amounts.

12. The celestial-object auto-tracking photographic camera according to claim 8, wherein said predetermined imaging area is a trimmed area which is defined by electronically trimming part of an entire imaging area of said image pickup device, and wherein said celestial-object auto-tracking photographic camera comprises a mover which moves said image pickup device in a parallel manner in directions orthogonal to the optical axis of said photographing optical system and rotates said trimmed area about an axis parallel to the optical axis.

13. The celestial-object auto-tracking photographic camera according to claim 8, wherein said operational device calculates said relative movement amounts from all of the input information and a spherical triangle which connects the zenith, a celestial pole and a position of a center of a picture plane on a celestial hemisphere.

14. The celestial-object auto-tracking photographic camera according to claim 13, wherein said operational device calculates an angle γ between horizontal and an equator at said celestial object from the equation $$\gamma = \arctan[\cos(\epsilon) \times \sin(A)/(\sin(\epsilon) \times \cos(h) - \cos(\epsilon) \times \sin(h) \times \cos(A))]$$

from said latitude ε, said azimuth angle A, said elevation angle h, a rotational angle ξ from the horizontal direction and about the optical axis of said photographing optical system as attitude information of said photographic apparatus, and a focal length f of said photographing optical system, and calculates relative movement amounts Δx and Δy of said celestial object image at a predetermined time T with respect to a long-side direction and a short-side direction of said image pickup device from the following equations, $$\Delta x = x \times \cos(\gamma + \xi) + y \times \sin(\gamma + \xi), \text{ and}$$

$$\Delta y = x \times \sin(\gamma + \xi) + y \times \cos(\gamma + \xi),$$

wherein $$\Delta x = f \times \sin\theta \times \sin\phi, \text{ and}$$

$$\Delta y = f \times \sin\theta \times \cos\theta(1 - \cos\phi),$$

wherein θ represents an angle between a direction toward a celestial pole and the optical axis of said photographing optical system, and φ represents an angle of rotation of the earth at said predetermined time T.

15. The method of automatically tracking and photographing a celestial object according to claim 1, the attitude information of said photographic apparatus being input upon a release switch of the photographing apparatus being turned ON.

16. The celestial object auto tracking photographic camera according to claim 8, said camera being provided with a gravity sensor which inputs the attitude information of said photographic camera.

17. The celestial object auto tracking photographic camera according to claim 8, further comprising a release switch, the attitude information of said photographing apparatus being input upon said release switch being turned ON.

18. The method of automatically tracking and photographing a celestial object according to claim 1, further including locating a photographic apparatus at a fixed location with respect to the ground.

19. The method of automatically tracking and photographing a celestial object according to claim 1, further comprising inputting date/time information.

\* \* \* \* \*